(12) United States Patent
Wilson

(10) Patent No.: US 10,913,316 B2
(45) Date of Patent: Feb. 9, 2021

(54) TIRE CHANGER

(71) Applicant: Donald A. Wilson, Ravenna (CA)

(72) Inventor: Donald A. Wilson, Ravenna (CA)

( * ) Notice: Subject to any disclaimer, the term of this patent is extended or adjusted under 35 U.S.C. 154(b) by 906 days.

(21) Appl. No.: 15/188,564

(22) Filed: Jun. 21, 2016

(65) Prior Publication Data

US 2017/0151841 A1    Jun. 1, 2017

(30) Foreign Application Priority Data

Nov. 30, 2015   (CA) ...................................... 2913652

(51) Int. Cl.
*B60C 25/01* (2006.01)

(52) U.S. Cl.
CPC .................................. *B60C 25/015* (2013.01)

(58) Field of Classification Search
CPC ...... B60C 25/015; B60C 25/025; B60C 25/04
See application file for complete search history.

(56) References Cited

U.S. PATENT DOCUMENTS

| | | | | |
|---|---|---|---|---|
| 2,760,563 A * | 8/1956 | Bishman | ................ | B60C 25/02 157/1.26 |
| 3,008,512 A * | 11/1961 | Foster | ................ | B29B 17/0206 157/1.28 |
| 3,942,575 A * | 3/1976 | Blomgren, Sr. | ...... | B60C 25/025 157/1.17 |
| 4,357,977 A * | 11/1982 | Bubik | ................... | B60C 25/132 157/1.28 |
| 4,756,354 A * | 7/1988 | Callas | ..................... | B60C 25/02 157/1.17 |
| 4,995,439 A * | 2/1991 | Burge | ................... | B60C 25/025 157/1.17 |
| 7,100,660 B2 | 9/2006 | Corghi et al. | | |
| 2005/0077013 A1 | 4/2005 | Corghi et al. | | |
| 2015/0224833 A1 | 8/2015 | Immler et al. | | |

OTHER PUBLICATIONS

Aircraft Tire Bead Breaker, Mar. 1, 2016, www.myrv10.com/tips/tools/Bead_Breaker/index.html.
Bead Breaker Jm Bb 16t, Mar. 1, 2016, www.jmtyremarc.in/tyre-buffing-blades.html.
New Coats 7065EX AX bead breaker shoe w/handle, Mar. 1, 2016, www.ebay.co.uk/itm/New-Coats-7065EX-AX-bead-breaker-Shoe-w-handle-Limited-Edition-tire-changer.
Tyre Bead Breaker, Mar. 1, 2016, www.mandp.co.uk/index.php/default/tyre-bead-breaker-12-18inch-diameter.html.
K&L Supply Co. MC116 Deluxe Tire Bead Breaker, Mar. 1, 2016, www.jpcycles.com/product/352-295.
FTP Deluxe Bead Breaker, Mar. 1, 2016, www.fastech-racing.com/ftp-deluxe-bead-breaker.html.

* cited by examiner

*Primary Examiner* — Joseph J Hail
*Assistant Examiner* — J Stephen Taylor

(57) ABSTRACT

A tire changer which utilizes an elongated bead breaker assembly with a tool that defines a pair of contiguous, substantially planar tire contact surfaces which define therebetween an included angle in the range of about 155 to about 165 degrees. The tool is situated at an included angle of about 55 to 65 degrees with respect to longitudinal axis of the elongated bead breaker assembly.

6 Claims, 4 Drawing Sheets

TIRE CHANGER

CROSS-REFERENCE TO RELATED APPLICATION

This application claims priority of Canadian Patent Application No. 2,913,652, filed on Nov. 30, 2015.

FIELD OF INVENTION

This invention relates to a vehicle wheel tire changing device. More particularly, this invention relates to a tire changing device that can be readily adapted for use with a wide variety of tire sizes.

BACKGROUND OF INVENTION

Scooters, all-terrain vehicles (ATVs), golf carts, snow blowers, trailers, and the like, are equipped with wide variety of tire sizes that require changing from time to time. The present invention provides a relatively inexpensive, readily portable and reliable device for removing tires from wheel rims.

SUMMARY OF INVENTION

A tire changer, particularly well suited for changing tires on trailers, all-terrain vehicles (ATVs), utility machines, and the like, utilizes a specially contoured bead release tool carried on an adjustable frame. The tire changer has a relatively small footprint, can fit into an ordinary bench vise, is readily portable or can be permanently or temporarily mounted to a suitable work surface.

In particular, a tire changer embodying the present invention comprises a hollow base bar open at one end and having a rectangular cross-section, an upstanding threaded centering shaft on the hollow base bar, a wheel rim locking clamp threadedly received on the centering shaft, a L-shaped member having a mounting arm slidably received in the hollow base bar and a support arm, a bead breaker arm slidably mounted to the support arm and having a distal end portion, and a bead breaker assembly threadedly mounted to the bead breaker arm at the distal end portion thereof. The bead breaker assembly includes a bead breaking tool which defines a pair of contiguous, substantially planar tire contact surfaces situated at an included angle therebetween of about 155 degrees to about 165 degrees, preferably at about 160 degrees, and at an included angle of about 55 degrees to about 65 degrees, preferably at about 60 degrees, with respect to longitudinal axis of the bead breaker assembly.

A tire changer kit includes the above-enumerated structural elements together with a tire mounting bar, a tapered centering cone, and a set of adapters.

BRIEF DESCRIPTION OF THE DRAWINGS

The accompanying drawings constitute a part of this application and illustrate one or more embodiments of the invention.

In the drawings.

DESCRIPTION OF PREFERRED EMBODIMENTS

Figure 1:
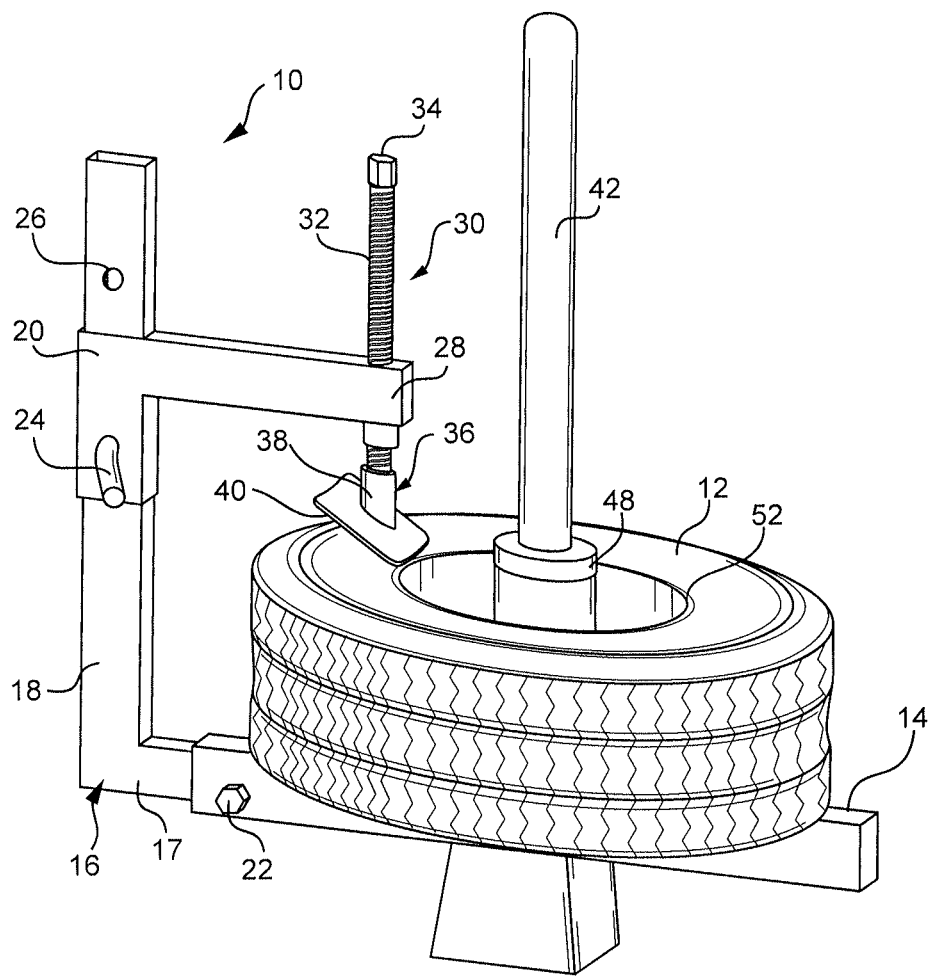
FIG. 1 is a perspective view of an embodiment of the present tire changer ready for use.
Figure 2:
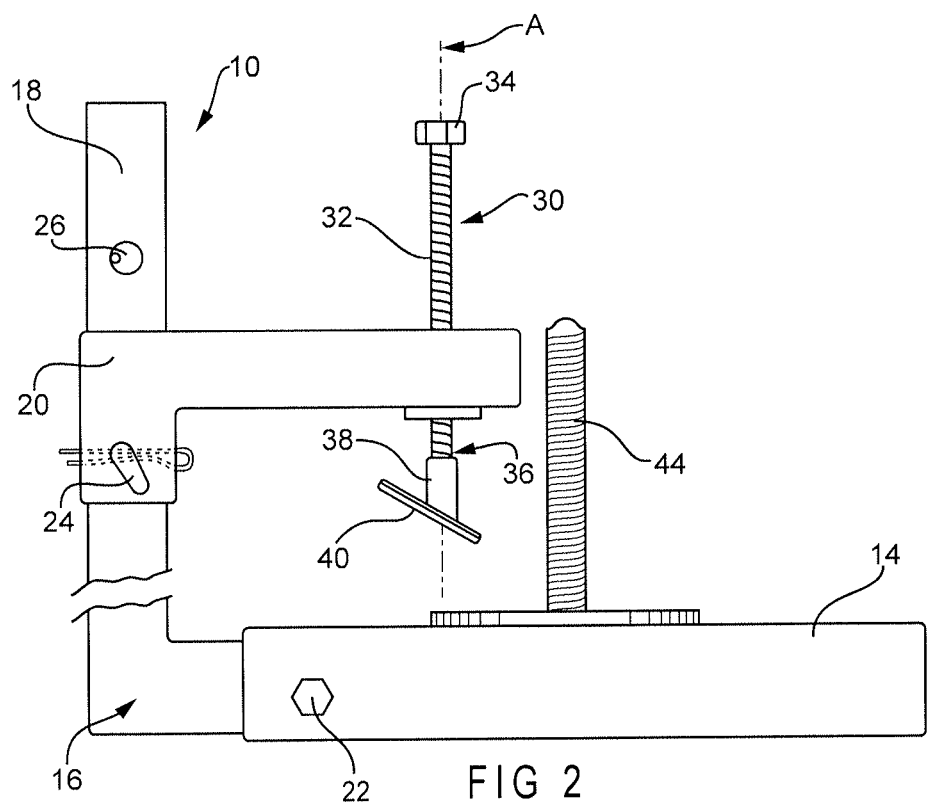
FIG. 2 is a side elevation of an embodiment of the present tire with wheel rim locking clamp removed.

Referring to FIGS. 1 and 2, tire changer 10 is shown with tire 12 on wheel rim 52 positioned for removal from wheel rim 52. Tire changer 10 includes hollow base bar 14 provided with a threaded centering shaft or post 44 and L-shaped member 16 having mounting arm 17 and normally upstanding support arm 18. Mounting arm 17 is slidably received in an open end of hollow base bar 14 which has a rectangular, preferably square, cross-section. Set screw 22 in hollow base bar 14 abuts mounting arm 17 and is used to lock L-shaped member 16 in a desired position.

Bead breaker arm 20 is slidably received on support arm 18 and held in place at a selected height above base bar 14 and tire 12 by pin 24 in a through aperture provided on support arm 18. The through aperture is one of a series of spaced through apertures, such as aperture 26, along the length of support arm 18, for positioning bead breaker arm 20 relative to tire 12. Bead breaker arm 20 carries elongated bead breaker assembly 30 at distal end portion 28 of arm 20.

Bead breaker assembly 30 includes threaded rod 32 which is threadedly engaged with arm 20, nut 34 fixed at proximal end of rod 32, and bead breaking tool 36 at distal end portion of rod 32. Bead breaking tool 36 is rotatably mounted at the distal end portion of rod 32 so that tool 36 can be urged against tire 12 when rod 32 is turned to impart downwardly movement to tool 36 even when tool 36 is in contact with tire 12. The axis of rotation of rod 32 defines longitudinal axis A (FIG. 2) of bead breaker assembly 30.

Figure 5:
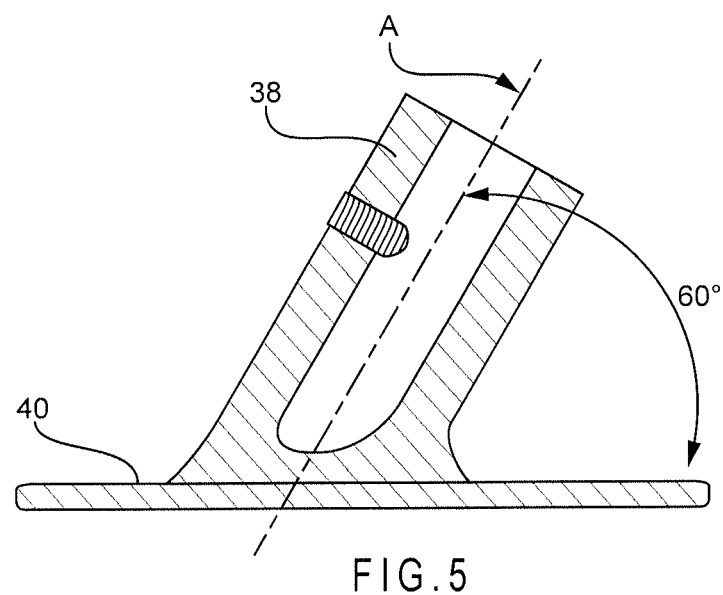
FIG. 5 is a side sectional elevation of the bead breaking tool shown in FIG. 3.

Bead breaking tool 36 includes plate 40 which is unitary with boss 38. As stated hereinabove, the distal end portion of threaded rod 32 is situated at an included angle of about 60 degrees with respect to longitudinal axis A of bead breaker assembly 30 (FIG. 5).

Figure 6:
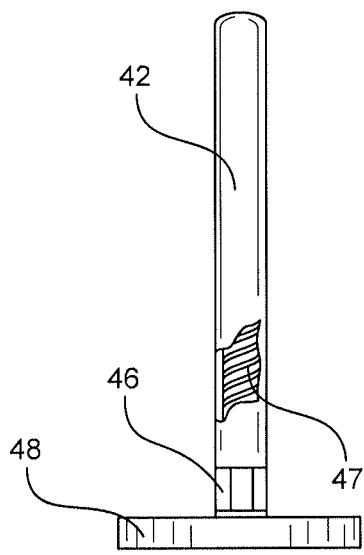
FIG. 6 is a side elevational view of a wheel rim locking clamp, partially broken away to show interior detail.

Tire 12 on wheel rim 52 is held in a fixed position on hollow base bar 14 by elongated, wheel rim locking clamp 42 with internal threads 47 which threadedly engage upstanding, externally threaded centering shaft 44 (FIGS. 2 and 6). Gripping flats 46 near circular base 48 of locking clamp 42 facilitate tightening of locking clamp 42 and immobilizing wheel rim 52. In the alternative, or in lieu of gripping flats 46, proximal end portion 47 of clamp 42 can be configured to receive a socket wrench or the like. The periphery of base 48 also can have a knurled surface to facilitate gripping. Base 48 is sized to abut central portion of a wheel rim. In the alternative, adapters can be provided for placement between base 48 and a wheel rim as will be discussed hereinbelow.

Figure 7:
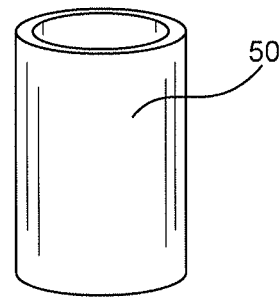
FIG. 7 is a perspective view of relatively large diameter adapter sleeve.
Figure 9:
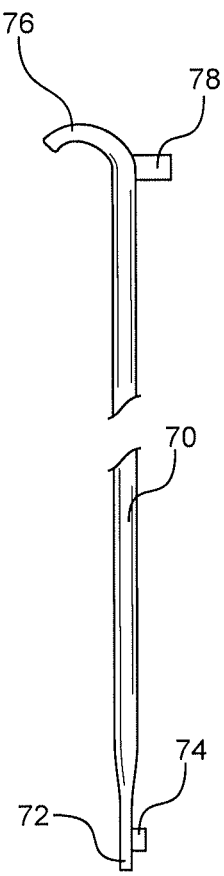
FIG. 9 is a perspective view of a relatively small diameter adapter sleeve.

As shown in FIGS. 1, 7 and 9, an optional hollow, open-ended adapter sleeve such as sleeve 50 and sleeve 66 is positioned between base 48 and wheel rim 52 to facilitate centering of wheel rim 52 relative to bead breaker assembly 30.

FIG. 6 shows wheel rim locking clamp 42 removed from threaded centering post 44. Locking clamp 42 is hollow and is provided with internal threads 47 sized to engage the external threads on centering post 44.

Figure 3:
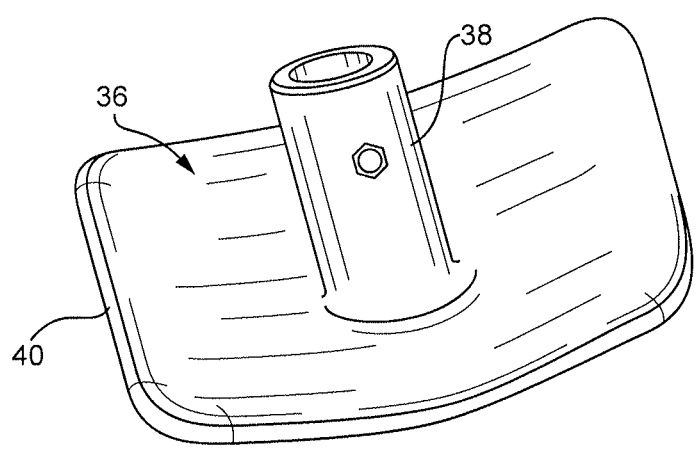
FIG. 3 is a perspective view of a bead breaking tool suitable for use with a tire changer embodying the present invention.
Figure 4:
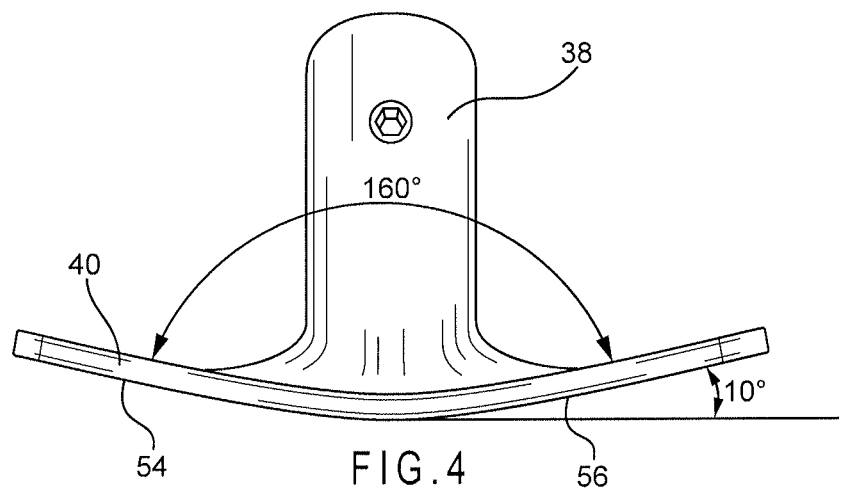
FIG. 4 is a front elevational view of the bead breaking tool shown in FIG. 3.

Bead breaking tool 36 is further illustrated in FIGS. 3-5. Boss 38 is rotatable about the distal end of threaded rod 32 and is unitary with a bead breaker plate 40, which forms an included angle of 60 degrees with longitudinal axis A of bead breaker assembly 30 as can be seen in FIG. 5. Breaker plate 40 defines a pair of contiguous, substantially planar tire contact surfaces 54 and 56 which together form an included angle of 160 degrees. While a plate such as breaker plate 40 is the preferred configuration for a bead breaker tool for providing the necessary tire contact surfaces 54 and 56, a prismoid solid, and the like, having a pair of contiguous sides that define an included angle of 160 degrees can also serve to provide the substantially planar tire contact surfaces.

Figure 8:
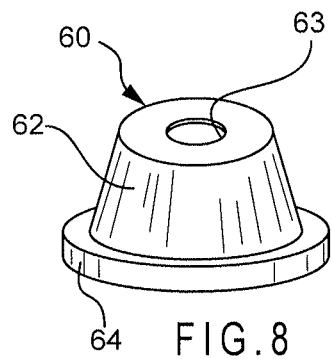
FIG. 8 is a perspective view of a tapered adapter for use with wheel rims.

A tapered adapter well suited for use with bolt-on wheel rims is shown in FIG. 8. Tapered adapter 60 is in the form of a truncated cone 62 with a central through passageway 63 which terminates in a circular, unitary disc 64 with a central hole (not shown) aligned with central through passageway 63. Passageway 63 and the central hole are sized to accommodate threaded centering post 44.

The most common center hole sizes for small tire rims are ½", ⅝" and ¾". Adapter sleeves are provided for tire rims with ⅝" and ¾" center holes. The length of the adapter sleeve depends on the depth of the rim and preferably is in the range of about 6 inches to about 8 inches. The adapter and the adapter sleeves are sized to slide over the threaded centering shaft or post and rest against the bearing or bushing of the wheel. A suitable material of construction for the adapter sleeve is steel, and the like. Typical adapter sleeves are illustrated in FIGS. 7 and 9.

FIG. 9 illustrates yet another adapter, in the form of a hollow, open ended pipe segment or sleeve 66 that can be used together with tapered adapter 60 for relatively smaller wheel rims when necessary. If desired, sleeve 66 can be unitary with tapered adapter 60.

Figure 10:
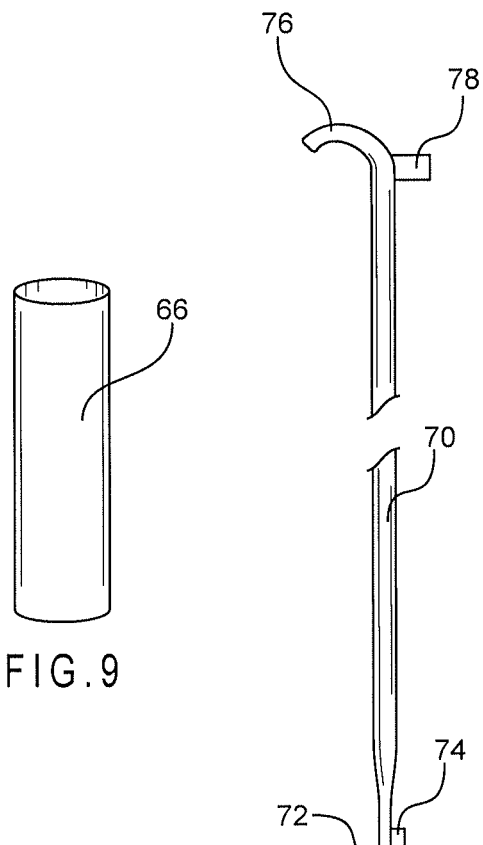
FIG. 10 is a side view of a tire demounting/mounting bar suitable for use with the present tire changer.

A tire demounting/mounting bar or tool suitable for use with the present tire changer is shown in FIG. 10 and comprises an elongated, rigid tire bar 70 provided at one end with a flat, trapezoidal end portion or blade 72 and a bead stop or abutment 74 between end portion 72 and bar 70. At the other end tire bar 70 is provided with a curled end portion 76 and a bead stop or abutment 78 between curled end portion 76 and bar 70. Bead stops 74 and 78 control position of the bead during demounting and mounting of the tire.

In a kit form, the present tire service kit includes a hollow base bar, open at one end, provided with threaded centering shaft, and having a rectangular cross-section; an internally threaded wheel rim locking lamp for threaded engagement with the centering post; a L-shaped member having a first part adapted to be slidably receivable within the hollow base bar and a normally upstanding second part; a bead breaker arm adapted for slidable positioning on the upstanding second part and having a distal end portion; and a bead breaker assembly for threaded mounting to the bead breaker arm, the bead breaker assembly including a bead breaking tool which defines a pair of contiguous, substantially planar tire contact surfaces at an included angle therebetween of about 155 degrees to about 165 degrees and situated at an included angle of about 55 degrees to about 65 degrees relative to longitudinal axis A of the bead breaker assembly. The kit optionally can include adapters such as adapter sleeves and adapter cones, as well as a tire tool.

In use, the tire changer is operated by first centering and installing a tire to be demounted on the hollow base bar 14 which has been suitably anchored on a workbench, held in a vise, or immobilized in a similar manner. Valve core is removed from the tire to ensure that no air remains trapped inside the tire. The tire is installed using an appropriate adapter, if needed, and threading the wheel rim locking clamp onto externally threaded rod 32. Thereafter the L-shaped member 16 carrying bead breaker arm 20, together with bead breaker assembly 30, is inserted into the hollow base bar 14, adjusted to fit the tire, and locked in place using set screw 22. Bead breaking tool 36 of bead breaker assembly 30 is then urged down against the tire using a socket wrench, or the like implement, engaged with nut 34 until the bead is separated from the rim.

One or more adapters can be utilized together with the wheel rim locking clamp, depending on the type of rim that carries the tire. For example. as can be seen in FIG. 1, an adapter sleeve is placed between the wheel rim and the wheel rim locking clamp before the locking clamp is threaded onto the shaft. In some cases an adapter cone such as shown in FIG. 8 is utilized as well, either before or after the wheel rim is positioned on the shaft.

Once the bead is separated, the L-shaped member 16 and the bead breaker arm 20 are removed from hollow base bar 14, the tire is turned over to break the bead on the opposite side, and the bead breaking procedure described hereinabove is repeated.

Rigid tire bar 70 can be used to separate the tire from the rim while the rim remains tightened down on the hollow base bar so that the tire does not spin. The flat, blade-like end portion of the tire bar 70 is inserted under the loosened bead and the bead is raised above and around the rim by manipulation of the tire bar 70 around the rim while tire bar 70 abuts against locking clamp 42.

Preferably, an appropriate tire lubricant, such as any of the commercially available tire lubricants, vegetable oil based soap, and the like, is utilized while demounting and mounting a tire in order to protect the bead from damage and to facilitate the demounting/mounting process.

To reinstall the tire on the rim, the curled end portion 76 of the tire tool 70 is hooked over the rim with the tire bead riding on top of the curled end portion up to the stop or abutment 78, and the bead is pushed in place over the rim.

Thereafter the tire can be removed from its position on the hollow base bar, the valve core reinstalled, and the tire inflated to manufacturer's specifications.

The foregoing description and the drawings are intended as illustrative and are not to be taken as limiting. Still often variants and rearrangements of parts within the spirit and scope of this invention will readily present themselves to those skilled in the art.

I claim:
1. A tire changer comprising
   a hollow base bar having an open end and a rectangular cross-section;
   a threaded rim centering shaft carried by the hollow base bar;
   a wheel rim locking clamp threadedly received on the rim centering shaft;
   a L-shaped member having a mounting arm slidably received in the hollow base bar and an upstanding support arm;

a bead breaker arm slidably mounted to the upstanding support arm and having a distal end portion; and an elongated bead breaker assembly threadedly mounted to the bead breaker arm at the distal end portion thereof;

the bead breaker assembly including a bead breaking tool defining a pair of contiguous, substantially planar tire contact surfaces defining an included angle of about 155 to about 165 degrees therebetween and situated at an included angle of about 55 degrees to about 65 degrees with respect to longitudinal axis of the bead breaker assembly.

2. The tire changer in accordance with claim 1 wherein the tire contact surfaces define an included angle of about 160 degrees.

3. The tire changer in accordance with claim 1 wherein the bead breaking assembly includes a threaded rod and the bead breaking tool is a plate rotatably mounted at a distal end portion of the threaded rod at an included angle of about 60 degrees with respect to a longitudinal axis of the threaded rod and wherein the plate defines the planar tire contact surfaces.

4. The tire changer in accordance with claim 3 wherein the included angle between the planar tire contact surfaces is about 160 degrees.

5. A tire service kit which comprises
a hollow base bar, open at one end, provided with a threaded centering shaft, and having a rectangular cross-section;
an internally threaded wheel rim locking clamp for threaded engagement with the centering post;
a L-shaped member having a mounting arm slidably receivable within the hollow base bar and a support arm;
a bead breaker arm for slidable positioning on the support arm and having a distal end portion; and an elongated bead breaker assembly for threaded mounting to the bead breaker arm and including a bead breaking tool which defines a pair of contiguous, substantially planar tire contact surfaces at an included angle therebetween of about 155 degrees to about 165 degrees, the bead breaking tool being situated at an included angle of about 55 degrees to about 65 degrees relative to a longitudinal axis of the elongated bead breaker assembly.

6. The tire service kit in accordance with claim 5 wherein the bead breaking tool is a plate defining the tire contact surfaces at an included angle of about 160 degrees and defining an included angle of about 60 degrees with the longitudinal axis of the elongated bead breaker assembly.

* * * * *